United States Patent [19]
Yamaguchi et al.

[11] Patent Number: 5,948,268

[45] Date of Patent: *Sep. 7, 1999

[54] METHOD FOR PREVENTING SCALE FORMATION AND CORROSION IN CIRCULATING WATER

[75] Inventors: Shigeru Yamaguchi; Takashi Fujisawa, both of Himeji, Japan

[73] Assignees: Nippon Shokubai Co., Ltd., Osaka; Kurita Water Industries, Ltd., Tokyo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/695,849

[22] Filed: Aug. 9, 1996

[30] Foreign Application Priority Data

Aug. 11, 1995 [JP] Japan ................................. 7-206176

[51] Int. Cl.$^6$ ................. C02F 5/12; C02F 5/10
[52] U.S. Cl. ................. 210/701; 252/180; 526/280; 526/287
[58] Field of Search ................. 526/284, 259, 526/261, 289, 287, 304, 307.5, 307.6, 312, 318.41, 318.42, 307; 210/696, 698, 700, 701, 732, 733, 734

[56] References Cited

U.S. PATENT DOCUMENTS

| | | | |
|---|---|---|---|
| 4,200,563 | 4/1980 | Komiya | 526/287 |
| 5,126,108 | 6/1992 | Leighton | 210/700 |

FOREIGN PATENT DOCUMENTS

| | | |
|---|---|---|
| 0 396 303 | 11/1990 | European Pat. Off. . |
| 0 485 882 | 5/1992 | European Pat. Off. . |
| 0 613 863 | 9/1994 | European Pat. Off. . |
| 0 647 596 | 4/1995 | European Pat. Off. . |
| 5-163591 | 6/1993 | Japan . |

*Primary Examiner*—Christopher Henderson
*Attorney, Agent, or Firm*—Oblon, Spivak, McClelland, Maier & Neustadt, P.C.

[57] ABSTRACT

An agent for water treatment comprises a water-soluble polymer obtained by polymerizing a monomer component containing a water-soluble monomer capable of dissolving in water of 50° C. in the amount of 1 weight % or more, having an ethylenically unsaturated group, and exhibiting fluorescence. The water-soluble polymer has a ratio of fluorescence intensity $FL_1/FL_2$ larger than 1, wherein $FL_1$ is an intensity of fluorescence obtained in dissolving a water-soluble polymer in a concentration of 10 ppm in pure water, and $FL_2$ is an intensity of fluorescence obtained in dissolving phenol in a concentration of 0.1 ppm in pure water.

20 Claims, 2 Drawing Sheets

METHOD FOR PREVENTING SCALE FORMATION AND CORROSION IN CIRCULATING WATER

BACKGROUND OF THE INVENTION

1. Field of the Invention

This invention relates to an agent for water treatment which is effective in preventing scale formation, and more particularly to an agent for water treatment which contains a water-soluble polymer derived from a water-soluble monomer component exhibiting fluorescence and which is excellent in resistance of the polymer to gelation (hereinafter referred to as "gelation resistance").

2. Description of the Related Art

An organic compound such as water-soluble polymer has been widely used as an agent for preventing scale formation and an inhibitor against metal corrosion to prevent scale formation and corrosion in an aqueous system such as boiler water and cooling water. In the case of being used for preventing scale formation or inhibiting metal corrosion, the water-soluble polymer cannot exhibit a sufficient prevention or inhibiting effect unless the concentration of polymer in water is kept within a predetermined range. Accordingly, in practice, it is verified whether the polymer maintains its concentration at an optimum operation value by measuring the concentration of polymer for use in water treatment in an aqueous system while circulating boiler water or cooling water.

As a method for measuring the concentration of polymer for use in water treatment, there have been known colorimetric method, nephelometric method, lithium tracer method, and fluorescent tracer method. These methods have suffered the following problems. In colorimetric method and nephelometric method, normally, a great deal of time is required for manual measurement. Even if the measurement is conducted automatically, time required for such automatic measurement cannot be shortened either.

On the other hand, lithium tracer method and fluorescent tracer method are not a direct measurement method of directly measuring the concentration of polymer, but an indirect measurement method. Accordingly, in the case where a consumption amount of polymer is greatly changed due to an exceeded concentration of water which is to be treated and formation of scale, these indirect measurement methods fail to grasp the consumption amount of polymer accurately.

Recently, there have been proposed methods of measuring the concentration of polymer in a simplified, speedy and accurate manner by directly introducing a compound capable of absorbing ultra-violet radiation (European Laid-open Patent Publication No. EP647596) or a fluorescent substance (Japanese Laid-open Patent Publication No. 5-163591) into a polymer for water treatment. Introducing a compound capable of absorbing ultra-violet radiation and a fluorescent substance (hereinafter referred to as a "labeled compound") into a polymer is performed utilizing a polymer reaction of reacting a functional group in the polymer with a functional group in the labeled compound. However, in the case of polymer reaction, the reaction rate of the functional group in the polymer is low, and it is difficult to introduce the labeled compound into the polymer at a specified amount. Hence, the concentration of polymer in water to be treated cannot be accurately measured. Further, kinds of labeled compounds which have a functional group reactable with a functional group in polymer are few, and the combination of these polymers and labeled compounds are also limited.

There has also been proposed a method of introducing a labeled compound into a polymer by adding for copolymerization a labeled compound having an unsaturated double bond into a reaction system in obtaining a polymer for use in water treatment. However, all labeled compound monomers obtainable at the present have lipophilicity. Accordingly, an additional process of removing a solvent by distillation is required after copolymerization in an organic solution, which not only makes the process of obtaining water-soluble polymer for use in water treatment cumbersome but also is not advantageous in the aspect of environment, preventing a fire, cost performance and saving natural resources. Moreover, the introducing rate of labeled compound monomers is low, for which an improvement has been demanded.

SUMMARY OF THE INVENTION

In view thereof, it is an object of the present invention to provide an agent for water treatment comprising a water-soluble polymer capable of being produced by polymerization in an aqueous system and of measuring the concentration of water-soluble polymer existing in water to be treated in a simplified, speedy and accurate manner.

An agent for water treatment according to the present invention comprises a water-soluble polymer obtained by polymerizing a monomer component containing a water-soluble monomer capable of dissolving in water of 50° C. in the amount of 1 weight % or more, having an ethylenically unsaturated group, and exhibiting fluorescence, the water-soluble polymer having a ratio of fluorescence intensity $FL_1/FL_2$ larger than 1, wherein $FL_1$ is an intensity of fluorescence obtained in dissolving a water-soluble polymer in the concentration of 10 ppm in pure water, and $FL_2$ is an intensity of fluorescence obtained in dissolving phenol in the concentration of 0.1 ppm in pure water.

The water-soluble monomer may preferably have an oxyalkylene chain represented by $-[CHR^1(CH_2)_mO]_n-$ to show a favorable water solubility, wherein $R^1$ is a hydrogen or a methyl group, m is an integer from 1 to 3, and n is an integer from 1 to 100.

In particular, the water-soluble monomer may preferably be represented by the following formula I:

wherein $A^1$ and $A^2$ are independently a hydrogen, a methyl group or $-COOX$, respectively; $A^3$ is a hydrogen, a methyl group, $-COOX$ or $-CH_2COOX$; and $A^1$ and $A^2$ are not $-COOX$ at the same time; $A^1$ and $A^2$ are independently a hydrogen or a methyl group respectively when $A^3$ is $-COOX$ or $-CH_2COOX$; X is a hydrogen, an alkaline metal, an alkaline earth metal, an ammonium group or an organic amine group; $R^2$ is one of $-COO-$, $-CH_2COO-$, $-CONH-$, $-CH_2CONH-$, $-NH-$, $-(CH_2)_kNH-$, wherein k is an integer from 1 to 4, and $-(CH_2)_lO-$, wherein l is an integer from 1 to 4; $R^1$ is a hydrogen or a methyl group, m is an integer from 1 to 3, n is an integer from 1 to 100; and $R^3$ is an organic group derived from a cyclic aryl or a heterocyclic compound having a conjugated double bond.

When deriving the water-soluble polymer using the water-soluble monomer showing fluorescence, the water-soluble polymer may preferably be obtained by polymerizing a monomer component comprising 0.1 to 15 mol % of water-soluble monomer having an ethylenically unsaturated group and showing fluorescence; 70 to 95 mol % of monomer having carboxyl group(s) consisting of one or more kinds of monocarboxylic acid monomer or polycarboxylic acid monomer; and 5 to 30 mol % of 3-allyloxy-2-hydroxy propane sodium sulfonate in which the total amount of the monomers becomes 100 mol %.

Preferably, the water-soluble polymer may be obtained by polymerization in an aqueous system and a degree of gelation of said water-soluble polymer may be not larger than 0.02. With the above arrangement, attainable is the water-soluble polymer for use in water treatment which is excellent in grasping the concentration of water-soluble polymer in water, gelation resistance, and inhibiting formation of scale and corrosion, without the necessity of polymerization in an organic solution in which a cumbersome process of removing a solvent by distillation is required.

DETAILED DESCRIPTION OF THE INVENTION

Through continued researches, the present inventors have found a water-soluble monomer into which a fluorescent substance is introduced and come up with the present invention. It should be noted that an agent for water treatment according to the present invention includes an agent of preventing scale formation and corrosion, and a flocculant, however, the inventive water treatment agent is not limited to the above.

The gist of the present invention resides in that a water-soluble monomer having an ethylenically unsaturated group, exhibiting fluorescence, and capable of dissolving in water of 50° C. in the amount of 1 weight % or more (hereinafter merely referred to as a "water-soluble monomer") is used to obtain a water-soluble polymer for use in water treatment. In the present invention, it is required that an intensity of fluorescence of water-soluble polymer is large enough so that the concentration of water-soluble polymer existing in water can be measured in a simplified, speedy and accurate manner. Accordingly, an essential requirement in the present invention is set in such a manner that a ratio of fluorescence intensity $FL_1/FL_2$ is larger than 1, wherein denoted at $FL_1$ is an intensity of fluorescence obtained in dissolving water-soluble polymer in the concentration of 10 ppm in pure water, and denoted at $FL_2$ is an intensity of fluorescence obtained in dissolving phenol in the concentration of 0.1 ppm in pure water. It should be noted that in the present invention the intensity of fluorescence is obtained with the use of a fluorescence spectrophotometer (a product of Nippon Bunko K.K., FP-777 type, photomal voltage of Low). The fluorescence intensity ratio $FL_1/FL_2$ is preferably 5 or more, and more preferably 10 or more. It may also be preferable that an intensity of fluorescence $FL_3$ which is obtained in solving water-soluble monomer which is a constituent of water-soluble polymer in the concentration of 0.1 ppm in pure water is larger than $FL_2$ in order to increase the fluorescence intensity of water-soluble polymer. This is because the larger the fluorescence intensity of water-soluble monomer, the larger the fluorescence intensity of water-soluble polymer, with the result that the concentration of water-soluble polymer can be measured easily. The fluorescence intensity ratio of $FL_3/FL_2$ is preferably 5 or more, and more preferably 10 or more.

Any water-soluble monomer can be used as far as the monomer exhibits fluorescence and can be solved in water of 50° C. in the amount of 1 weight % or more (preferably 2 weight % or more). In particular, there may preferably be used monomer in which an oxyalkylene chain represented by —[CHR$^1$(CH$_2$)$_m$O]$_n$—, wherein R$^1$ is a hydrogen or methyl group, m is an integer from 1 to 3, and n is an integer from 1 to 100, is bonded. Water solubility is obtained by setting the integers m and n in the above oxyalkylene chain at a desired value within the above range. Preferably, if the integer n is 5 or more, the water-soluble monomer assuredly exhibits a favorable water solubility (the ability of dissolving in water of 50° C. in the amount of 5 weight % or more).

Further, since the moiety represented by —[CHR$^1$(CH$_2$)$_m$O]$_n$— is nonion, this moiety is effective in suppressing a gelation of water-soluble polymer at a low level and enhancing gelation resistance. Considering the solubility into water and the water-treatment ability of water-soluble polymer for use in water treatment, the integer n is preferably from 6 to 40, and more preferably lies in the range of 8 to 30. It may be appreciated that the oxyalkylene chain may comprise in such a manner that R$^1$ in one oxyalkylene is a hydrogen and that in another oxyalkylene is a methyl group if the integer n is 2 or more. In other words, the oxyalkylene chain may include an ethylene oxide (ethylene glycol)-propylene oxide (propylene glycol) block chain (wherein m is 1).

The most preferable compound among the water-soluble monomers having an ethylenically unsaturated group and exhibiting fluorescence according to the present invention can be represented by the following formula I:

I wherein A$^1$ and A$^2$ are independently a hydrogen, a methyl group or —COOX, respectively; A$^3$ is a hydrogen, a methyl group, —COOX or CH$_2$COOX; and A$^1$ and A$^2$ are not —COOX at the same time; A$^1$ and A$^2$ are independently a hydrogen or a methyl group respectively when A$^3$ is —COOX or —CH$_2$COOX; X is a hydrogen, an alkaline metal, an alkaline earth metal, an ammonium group or an organic amine group; R$^2$ is one of —COO—, —CH$_2$COO—, —CONH—, —CH$_2$CONH—, —NH—, —(CH$_2$)$_k$NH— (wherein k is an integer from 1 to 4), and —(CH$_2$)$_l$O— (wherein l is an integer from 1 to 4); R$^1$ is a hydrogen or a methyl group, m is an integer from 1 to 3, n is an integer from 1 to 100; and R$^3$ is an organic group derived from an aryl or a heterocyclic compound having a conjugated double bond.

The above water-soluble monomer (I) has the moiety —[CHR$^1$(CH$_2$)$_m$O]$_n$— for applying water solubility to the monomer and the moiety R$^3$ having fluorescence. R$^3$ is an organic group derived from an aryl or a heterocyclic compound having a conjugated double bond, and an organic residue of aryl or heterocyclic compound having the conjugated double bond and one of the functional groups capable of being added to the oxyalkylene chain in the water-soluble monomer (I) such as amino group, hydroxyl group, mercapto group, carboxyl group, and halogen.

More specifically, in order to obtain water-soluble monomer (I) exhibiting fluorescence, the following two methods can be taken. One of the methods is: an aryl or heterocyclic compound having a conjugated double bond and one of the functional groups such as amino group, hydroxyl group, mercapto group, carboxyl group, and halogen is reacted with alkyleneoxide, and then added with an unsaturated monomer through $R^2$ represented in the above formula I. The other method is: an unsaturated monomer is added with alkyleneoxide through $R^2$; and a hydroxyl group at one end of the oxyalkylene chain of the monomer obtained by the additional reaction is reacted with an aryl or heterocyclic compound having a conjugated double bond and one of the functional groups such as amino group, hydroxyl group, mercapto group, carboxyl group, and halogen.

Examples of cyclic aryl (aromatic) compound or heterocyclic compound which has a functional group and a conjugated double bond usable both in the above two methods are: compounds having an amino group such as aniline, naphthyl amine, 2-aminofluorene, aminoanthracene, aminoanthraquinone, imidazole, phenylimidazole, 2-phenylbenzoimidazole, carbazole, aminobiphenyl; compounds having a hydroxyl group such as phenol, naphthol, fluorenol, 9-hydroxyanthracene, 2-hydroxynaphtoquinone, hydroxyanthraquinone, pyrenemethanol, hydroxycoumarin, hydroxyflavone, hydroxybiphenyl, xanthydrol, dibenzosuberenol, 9-anthracenemethanol, acenaphthylene; compounds having a mercapto group such as thiophenol, thionaphthol; compounds having a carboxyl group such as benzoic acid, naphthalenecarboxylic acid, 9-fluorenecarboxylic acid, 9-anthracenecarboxylic acid, anthraquinone-2-carboxylic acid, phenyl benzoate; and compounds having a halogen group such as benzyl chloride, chloromethylanthracene, chloromethylanthraquinone.

Examples of water-soluble monomer (I) are: polyethyleneglycol phenylether(meth)acrylate, polyethyleneglycol phenylether(meth)allylether, polypropyleneglycol phenylether(meth)acrylate, polypropyleneglycol phenylether(meth)allylether; polyethyleneglycol phenylthioether(meth)acrylate, polyethyleneglycol phenylthioether(meth)allylether, polypropyleneglycol phenylthioether(meth)acrylate, polypropyleneglycol phenylthioether(meth)allylether; polyethyleneglycol-2-phenylaminoethylether (meth)acrylate, polyethyleneglycol-2-phenylaminoethylether (meth) allylether, polypropyleneglycol-2-phenylaminoethylether (meth)acrylate, polypropyleneglycol-2-phenylaminoethylether (meth)allylether; polyethyleneglycol benzoate(meth)acrylate, polyethyleneglycol benzoate(meth)allylether, polypropyleneglycol benzoate(meth)acrylate, polypropyleneglycol benzoate(meth)allylether; polyethyleneglycol benzylether(meth)acrylate, polyethyleneglycol benzylether(meth)allylether, polypropyleneglycol benzylether(meth)acrylate, polypropyleneglycol benzylether(meth)allylether; polyethyleneglycol naphthylether(meth)acrylate, polyethyleneglycol naphthylether(meth)allylether, polyethyleneglycol naphthylether(meth)acrylate, polyethyleneglycol naphthylether(meth)allylether; polyethyleneglycol-2-naphthylaminoethylether (meth)acrylate, polyethyleneglycol-2-naphthylaminoethylether (meth) allylether; polyethyleneglycol naphthoate(meth)acrylate, polyethyleneglycol naphthoate(meth)allylether; polyethyleneglycol naphthylmethylether(meth)acrylate, polyethyleneglycol naphthylmethylether(meth)allylether; polyethyleneglycol-9-anthrylmethylether(meth)acrylate, polyethyleneglycol-9-anthrylmethylether(meth)allylether; polyethyleneglycol-2-anthrylaminoethylether(meth)acrylate, polyethyleneglycol-2-anthrylaminoethylether (meth)allylether; polyethyleneglycol anthoate(meth)acrylate, polyethyleneglycol anthoate(meth)allylether; polyethyleneglycol fluorenylether(meth)acrylate, polyethyleneglycol fluorenylether(meth)allylether; polyethyleneglycol-2-fluorenylaminoethylether(meth)acrylate, polyethyleneglycol-2-fluorenylaminoethylether (meth)allylether; polyethyleneglycol fluorene-9-carboxylate (meth)acrylate, polyethyleneglycol fluorene-9-carboxylate (meth)allylether; polyethyleneglycol naphthoquinonylether (meth)acrylate, polyethyleneglycol naphthoquinonylether (meth)allylether; polyethyleneglycol anthraquinonylether (meth)acrylate, polyethyleneglycol anthraquinonylether (meth)allylether; polyethyleneglycol-2-anthraquinonylaminoethylether(meth)acrylate; polyethyleneglycol anthraquinone-2-carboxylate(meth)acrylate, polyethyleneglycol anthraquinone-2-carboxylate (meth)allylether; polyethyleneglycol pyrenylether(meth)acrylate, polyethyleneglycol pyrenylether(meth)allylether; polyethyleneglycol coumarylether(meth)acrylate, polyethyleneglycol coumarylether(meth)allylether; N-polyoxyethylene imidazole(meth)acrylate, N-polyoxyethylene phenylimidazole(meth)acrylate, N-polyoxyethylene-2-phenylbenzoimidazole (meth)acrylate, N-polyoxyethylene carbazole(meth)acrylate; polyethyleneglycol biphenylether(meth)acrylate, polyethyleneglycol biphenylether(meth)allylether; polyethyleneglycol-2-biphenylaminoethylether(meth)acrylate, polyethyleneglycol-2-biphenylaminoethylether(meth)allylether; polyethyleneglycol phenylbenzoate(meth)acrylate, polyethyleneglycol phenylbenzoate(meth)allylether; polyethyleneglycol phenylether monomaleate, polypropyleneglycol phenylether monomaleate; polyethyleneglycol phenylthioether monomaleate, polypropyleneglycol phenylthioether monomaleate; polyethyleneglycol-2-phenylaminoethylether monomaleate, polypropyleneglycol-2-phenylaminoethylether monomaleate; polyethyleneglycol benzoate monomaleate, polypropyleneglycol benzoate monomaleate; polyethyleneglycol benzylether monomaleate, polypropyleneglycol benzylether monomaleate; polyethyleneglycol naphthylether monomaleate, polyethyleneglycol-2-naphthylaminoethylether monomaleate; polyethyleneglycol naphthoate monomaleate, polyethyleneglycol naphthylmethylether monomaleate; polyethyleneglycol-9-anthrylmethylether monomaleate, polyethyleneglycol-2-anthrylaminoethylether monomaleate, polyethyleneglycol anthoate monomaleate; polyethyleneglycol fluorenylether monomaleate, polyethyleneglycol-2-fluorenylaminoethylether monomaleate; polyethyleneglycol fluorene-9-carboxylate monomaleate; polyethyleneglycol naphthoquinonylether monomaleate, polyethyleneglycol anthraquinonylether monomaleate, polyethyleneglycol-2-anthraquinonylaminoethylether monomaleate; polyethyleneglycol anthraquinone-2-carboxylate monomaleate; polyethyleneglycol pyrenylether monomaleate, polyethyleneglycol coumarylether monomaleate; N-polyoxyethylene imidazole monomaleate, N-polyoxyethylene phenylimidazole monomaleate, N-polyoxyethylene-2-phenylbenzoimidazole monomaleate, N-polyoxyethylene carbazole monomaleate; polyethyleneglycol biphenylether monomaleate, polyethyleneglycol-2-biphenylaminoethylether monomaleate, polyethyleneglycol phenylbenzoate monomaleate.

One or more kinds of the above monomers can be used as the water-soluble polymer (I). It should be noted that the moiety corresponding to polyethylene glycol or polypropylene glycol in the above illustrated compounds contains a block of polyethyleneglycol-polypropyleneglycol (ethyleneoxide-propyleneoxide).

Water-soluble polymer according to the present invention exhibits fluorescence by making water-soluble monomer having fluorescence one of a unit constituting the water-soluble polymer to accurately measure the concentration of water-soluble polymer in water.

Further, since the inventive water-soluble polymer uses monomer having a large intensity of fluorescence, the intensity of fluorescence of polymer obtained from this monomer becomes also large. Accordingly, when such water-soluble polymer is used as an agent for water treatment, the concentration of water-soluble polymer can be measured accurately and easily. Moreover, since the above compounds having fluorescence are water-soluble monomers, they can be polymerized with other monomers which will be described later in an aqueous system. Accordingly, a specified amount of these fluorescent compounds can be assuredly introduced into the polymer in an aqueous system. In addition, it is remarkably advantageous in that an effective polymerization in an aqueous solution can be adopted in the aspect of environment, preventing a fire, cost performance, and saving natural resources.

To synthesize water-soluble polymer showing excellent performance as an agent for water treatment, monomer having carboxyl group(s) consisting of one or more kinds of monocarboxylic acid monomer or polycarboxylic acid monomer and monomers other than the above (hereinafter merely referred to as "other monomers") if necessary may preferably be used in combination with the fluorescent water-soluble monomer for copolymerization. With the addition of these monomers, water-soluble polymer can be polymerized in an aqueous system in a simplified manner, and the thus obtained water-soluble polymer is excellent in preventing scale formation, inhibiting corrosion, and resistible against gelation.

Each monomer may preferably be used in the amount shown below. Specifically, fluorescent water-soluble monomer is used in the amount of 0.1 to 15 mol %; monomer having carboxyl group(s) consisting of one or more kinds of monocarboxylic acid monomer or polycarboxylic acid monomer is used in the amount of 70 to 99.9 mol %; and the other monomers are used in the amount of 0 to 30 mol % in which the total amount of the monomers becomes 100 mol %. Polymer obtained from these monomers can exhibit properties such as water solubility and scale formation preventing ability, and fluorescence in a well-balanced manner within the above range.

If the amount of monomer showing fluorescence is reduced, the fluorescent moiety to be introduced into the polymer is reduced, which makes it difficult to trace the concentration of the polymer in water. On the contrary, if water-soluble monomer exhibiting fluorescence is introduced into the polymer in the amount of 15 mol % or more, the ability of preventing scale formation and inhibiting corrosion is gradually deteriorated. This is also not favorable. If the other monomers are used in the amount exceeding 30 mol %, there is the likelihood that polymer obtained using these monomers may show deteriorated water solubility.

Examples of monomer having carboxyl group(s) consisting of one or more kinds of monocarboxylic acid monomer or polycarboxylic acid monomer are: monomers of unsaturated monocarboxylic acid such as acrylic acid, methacrylic acid, α-hydroxyacrylic acid, and crotonic acid, and salts thereof; and monomers of unsaturated polycarboxylic acid such as maleic acid, fumaric acid, itaconic acid, citraconic acid, and aconic acid, and salts thereof. One or more kinds of these monomers can be used as monomer having carboxyl group(s).

Examples of basic compounds which can form salts together with the monomers having carboxyl group(s) are: hydroxides of alkaline metal such as sodium, potassium, and lithium or carbonates thereof; alkylamines such as ammonia, monomethyl amine, dimethyl amine, triethyl amine; and alkanolamins such as monoethanolamine, diethanolamine, triethanolamine, isopropanolamine, sec-butanolamin. It may be appreciated that salts of polycarboxylic acid monomer occupy all or part of the carboxylic group(s).

Examples of the other monomers are: monomers having a sulfonic acid group such as vinyl sulfonic acid, styrene sulfonic acid, allyl sulfonic acid, and monomer derived from diene compounds such as isoprene and butadiene one of a conjugated double bond of which has undergone sulfonation; sulfoethylmethacrylate and sulfopropylmethacrylate, and salts thereof; monomers having a hydroxyl group such as 2-hydroxyethylmethacrylate (HEMA) and glycerylmonoallylether (GMAE); monomers having an amino group such as acrylamide, methacrylamide, allylamine; alkyl (meth)acrylate such as methylacrylate, monomers having an amide group and sulfonic acid group such as 2-acrylamide-2-methylpropane sulfonic acid (AMPS), and salts thereof; monomers having a hydroxyl group and sulfonic acid group such as 3-allyloxy-2-hydroxypropane sulfonic acid (HAPS) and salts thereof. The salts illustrated in the above monomers are salts obtained with the above-mentioned basic compounds.

Among the monomers having carboxyl group(s) and the other monomers which can be used together with the fluorescent water-soluble monomer, the following is favorably used: maleic acid or acrylic acid; combination of maleic acid and acrylic acid; combination of acrylic acid and allylsulfonic acid; combination of maleic acid and styrenesulfonic acid; combination of acrylic acid and 2-hydroxyethyl(meth) acrylate, combination of acrylic acid, 2-hydroxyethyl(meth) acrylate, and methylacrylate; and combination of monomers having carboxyl group and HAPS. In particular, if HAPS is used in the amount of 5 to 30 mol % in the other monomer, gelation resistance is remarkably improved. Accordingly, water-soluble polymer can be obtained eliminating the likelihood of gelation during operation of aqueous system such as boiler water or cooling water, and ability of inhibiting corrosion can be remarkably improved.

In case of using HAPS as the other monomers, HAPS can be introduced in an effective manner by adding fluorescent water-soluble monomer in the amount of 0.1 to 15 mol %, monomer having carboxyl group(s) consisting of one or more kinds of monocarboxylic acid monomer or polycarboxylic acid monomer in the amount of 70 to 95 mol %, and HAPS in the amount of 5 to 30 mol % to make the total amount of monomer 100 mol %.

According to the present invention, polymerization in an aqueous system is recommendable as a method of synthesizing water-soluble polymer. Specifically, the polymerization in an aqueous solution in which exclusively water is used as a medium for polymerization is preferable due to its simple use. The aqueous solution polymerization can be performed using a known method, i.e., with the use of a water soluble polymerization initiator, e.g., persulfates such as ammonium persulfate, sodium persulfate, potassium persulfate, peroxides such as hydrogen peroxide, persuccinic acid, peracetic acid, cumene hydroperoxide, and azo compounds such as 2,2'-azobis(2-amidinopropane)

hydrochloride. A polymerization accelerator such as sodium hydrogen sulfite and ascorbic acid may be used together in the aqueous solution polymerization. Polymer obtained by the aqueous solution polymerization can be directly used as an agent for water treatment without any chemical treatment. If necessary, the polymer may be used as a water treatment agent after attaining a desired neutralization level with the addition of the aforementioned basic compounds. Preferably, the weight-average molecular weight of water-soluble polymer lies in the range from 500 to 50000, and in view of water treating ability as a water treatment agent, may preferably lies in the range from 500 to 20000.

Gelation of the inventive water-soluble polymer is defined based on a measurement value of absorbance under the following conditions.

Measurement Condition on Gelation

Vessel: 500 cc tall beaker

Polymer: concentration of 40 ppm in a sample solution (solid concentration)

Sample Solution: 400 g of aqueous solution of $CaCl_2$ in the concentration of 400 ppm Temperature: 50° C.

pH 8

Period for placing the vessel in a stationary state: 1 hour

Measurement method: The solution was stirred for 5 minutes by the use of a stirrer, sampling was performed for the solution after stirring, and the absorbance of solution (ABS) was measured at UV 380 nm in a cell of 50 mm.

The degree of gelation is expressed using a numerical value for evaluating how easily water-soluble polymer is precipitated under the existence of calcium ion in water, and examined by measuring the degree of turbidity of the sample solution when the sample solution is heated under the existence of calcium ion based on absorbance of ultraviolet ray. The higher the numerical value of absorbance, the greater the turbidity of solution containing the polymer, which shows that a greater amount of polymer is precipitated in the sample solution under the existence of calcium ion.

Polymer having a higher degree of gelation is liable to be insoluble in water such as boiler water and cooling water, and hence, the ability of preventing metal corrosion and scale formation is remarkably lowered. Accordingly, polymer which does not cause gelation is desirably used to stably maintain the scale formation or corrosion preventing ability at a desired level. It is preferable to maintain the degree of gelation G not larger than 0.02 as shown in the following parameter, and more preferable to maintain the degree of gelation not larger than 0.01.

The following the parameter showing the degree of gelation. The less the numerical value, the higher the ability of preventing corrosion and scale formation as an agent for water treatment.

$G \leq 0.01$: hardly cause gelation $0.01 < G \leq 0.1$: not liable to cause gelation $0.1 < G \leq 0.2$: liable to cause gelation $0.2 \leq G$: liable to cause gelation greatly The inventive water treatment agent containing water-soluble polymer can be used in a similar manner as used in a conventional water treatment agent by e.g., injecting the agent in a predetermined amount in advance or intermittently into circulating water so as to keep the concentration of water treatment agent in the water at a predetermined level. Generally, the additive amount of 1 to 50 ppm is sufficiently effective as the water treatment agent.

The inventive water treatment agent may be added with phosphorus compounds such as phosphoric acid, polyphosphoric acid, and phosphonic acid and/or zinc phosphides according to needs, as well as the above-mentioned water-soluble polymer. These compounds are more effective in preventing corrosion. Further, it may be appreciated that a chlorine agent such as chlorine gas, calcium hypochlorite, sodium hypochlorite, and sodium isocyanuric acid chloride is added for slime control.

According to the present invention, polymerization in an aqueous system can be performed with the use of water-soluble monomer having fluorescence. Accordingly, eliminated is a cumbersome process of removing an organic solvent by distillation when an organic solution is used for polymerization, which is advantageous in providing polymer for use in water treatment in the aspect of preventing a fire, cost performance, and saving natural resources. Since water-soluble monomer having fluorescence can be introduced in a specified amount into the water-soluble polymer, and this polymer exhibits a high degree of intensity of fluorescence, the concentration of polymer to be added to water can be measured in a simplified, speedy, and accurate manner.

EXAMPLES

Examples of the present invention are given below. These are, however, given for the purpose of illustration only and are by no means intended to limit the scope of the invention. Percentage (%) given in the description below means weight %. In the examples, measurement of the degree of gelation was conducted using the aforementioned measurement method, and weight-average molecular weight, polymerization rate, intensity of fluorescence, corrosion rate, and scale inhibiting rate were obtained using the following methods.

[Weight-average Molecular Weight]

Weight-average molecular weight of sample polymer obtained by polymerization was measured using gel permeation chromatography (GPC). In the GPC, a column of ASAHI pack GFA-7MF (a product of Asahi Kasei Kogyo K.K.) was used with an eluate of 0.5% aqueous solution of phosphoric acid, and a standard sample of poly sodium acrylate (a product of Sowa Kagaku K.K.) was used as a molecular weight standard sample

[Rate of Polymerization]

The polymerization rate was calculated on the basis of solid concentration in a polymerization system after completion of polymerization and the amount of monomer used.

[Intensity of Fluorescence]

A sample polymer was dissolved in ultra pure water to prepare an aqueous solution containing the sample polymer in the amount of 10 mg/liter. Thereafter, the aqueous solution was put in a cell of non-fluorescence of 10 mm square and had its intensity of fluorescence measured by using a fluorescence spectrophotometer (a product of Nippon Bunko K.K.; FP-777 type) at the photomal voltage Low, the excited wave length of 230 nm, and the fluorescence wave length of 350 nm. It should be noted that the excited wave length was 294 nm and the fluorescence wave length was 358 nm in EXAMPLE 8 and in COMPARATIVE EXAMPLE 1; 226 nm and 293 nm in EXAMPLEs 10 and 11; 325 nm and 453 nm in COMPARATIVE EXAMPLE 2, respectively.

[Corrosion Rate]

Test water for testing corrosion rate was prepared with 134 ppm for calcium hardness (as $CaCO_3$), 170 ppm for total hardness (as $CaCO_3$), 600 ppm for M alkalinity, 95 ppm for concentration of chloride ions, 32 ppm for concentration of sulfate ions, and at pH 8 to 8.5. The thus prepared test water was poured in a 500 ml beaker. 50 ppm sample polymer as purity was added into the test water in the beaker at a temperature of 40° C. and pH 8.0. A low carbon steel SS-1 of 40 mm in width, 20 mm in length, and 1 mm in thickness (=0.213 dm$^2$) was degreased with acetone and polished with a sandpaper of #400. Thereafter, the low carbon steel was rinsed with acetone, dried in the air, and had the weight thereof measured to obtain a test piece.

The test water in which the above test piece was soaked in a hung state with a string was stirred at a speed of 100 rpm for 5 consecutive days. Thereafter, the test piece was taken out from the test water and then immersed in an aqueous solution containing 15% HCl and 1% IBIT (acid corrosion inhibitor) for about 15 seconds to rinse off a product generated by corrosion. Then, the test piece had its surface rinsed off with acetone, dried in the air, and had the weight thereof measured up to 0.1 mg. A difference in weight between before and after the test was calculated as the degree of corrosion, i.e., by the unit of mdd (mg/dm$^2$/day). At this time, a reference test piece which had not been soaked in the test water was also immersed in the aqueous solution containing 15% HCl and 1% IBIT for about 15 seconds to measure the difference in weight between before and after the test. The weight difference for the reference test piece was used as a correction value.

[Scale Inhibiting Rate]

170 g of water was put in 225 ml glass bottle, 10 g of 1.56% aqueous solution of CaCl$_2$.2H$_2$O was mixed with 5 g of 0.02% aqueous solution containing the sample polymer (3 ppm for a supersaturated aqueous solution obtained accordingly). The mixture was added with 10 g of aqueous solution of NaHCO$_3$ and 7 g of NaCl to make the total amount 200 g. Then, 530 ppm supersaturated aqueous solution of CaCO$_3$ was sealed and heated at a temperature of 70° C. for 8 hours. After the supersaturated aqueous solution was cooled, a product of precipitation was filtered through a membrane filter of 0.1 μm. The filtrate was analyzed according to JIS K0101, and a scale inhibiting rate (%) of inhibiting formation of calcium carbonate as scale was calculated using the following equation:

Scale inhibiting rate (%)=(C−B)(A−B)×100 wherein A is the concentration of calcium (%) dissolved in the test solution before the test; B is the concentration of calcium (%) in the filtrate without the addition of scale formation inhibitor; and C is the concentration of calcium (%) in the filtrate after the test.

Example 1

Figure 1:
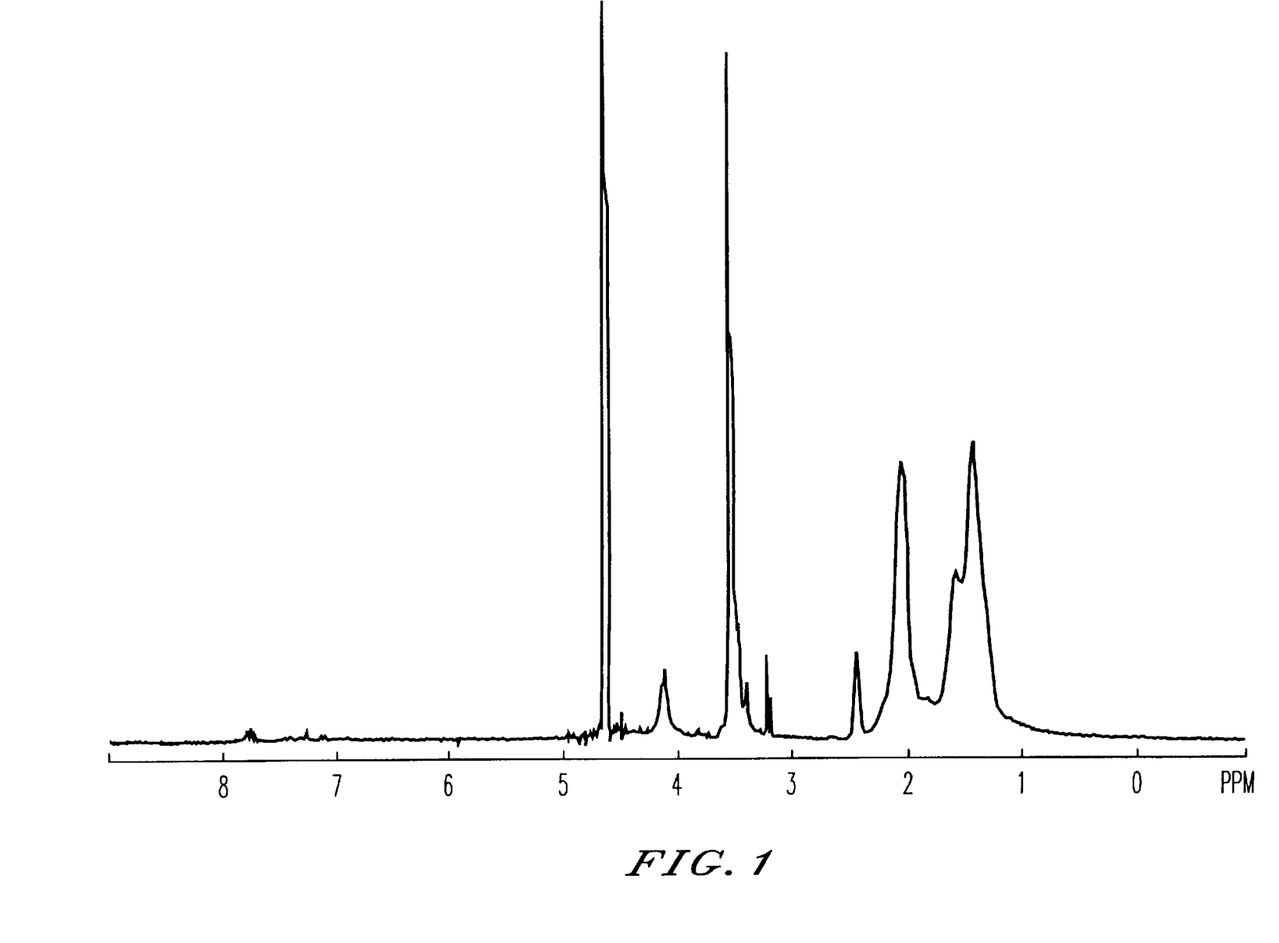
FIG. 1 is a graph showing NMR spectrum of water-soluble polymer obtained in EXAMPLE 1.
Figure 2:
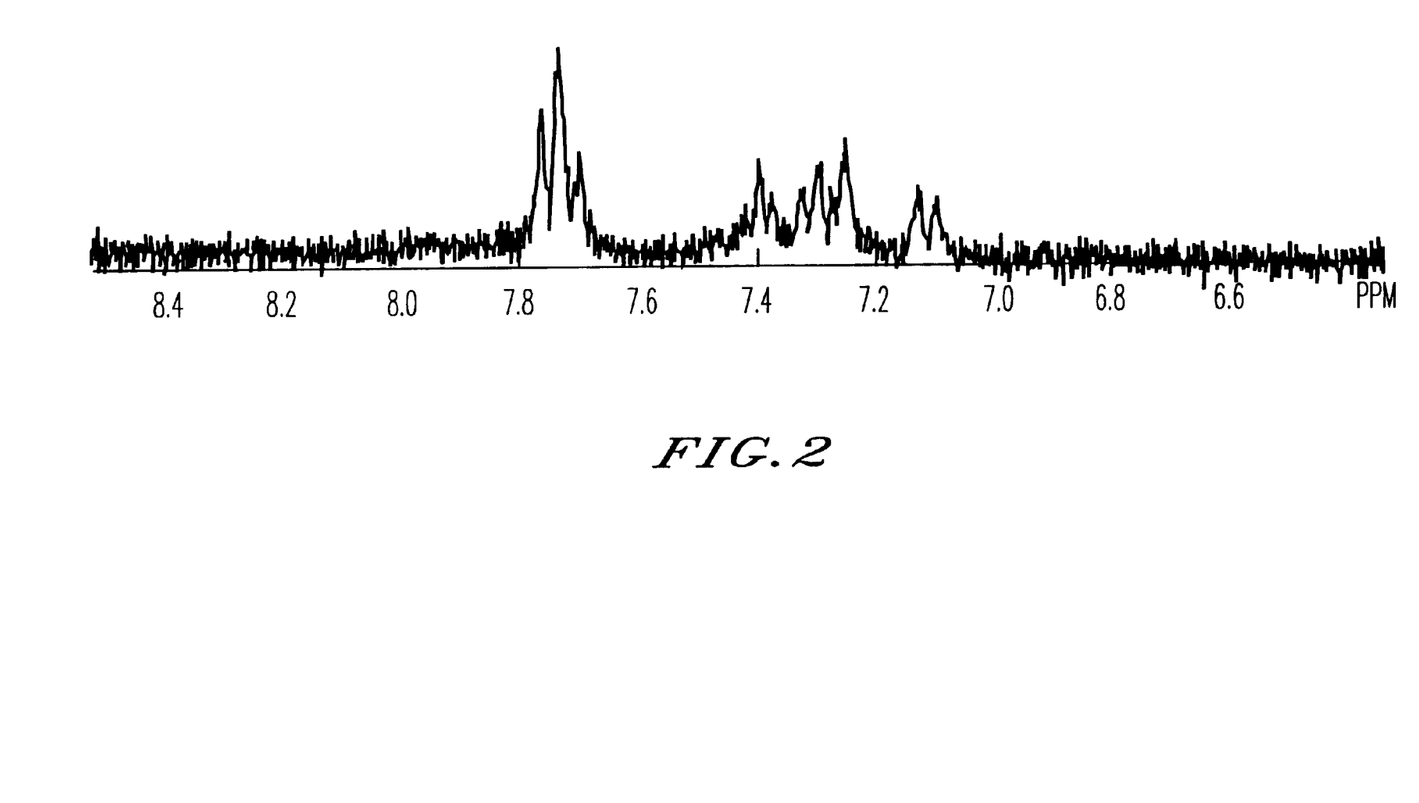
FIG. 2 is a graph enlargedly showing NMR spectrum corresponding to 7 to 8 ppm of water-soluble polymer obtained in EXAMPLE 1.

145 g of deionized water was put in a 1-liter four-necked flask provided with a thermometer, a stirrer and a reflux condenser, and stirring was continued at a temperature of 90° C. Titration was carried out for 270 g of 40% aqueous solution of acrylic acid, 100 g of 3% aqueous solution of ammonium persulfate, and 115 g of 15% aqueous solution of polyethyleneglycol naphthyletheracrylate (addition product of ethyleneglycol of 20 mol). Titration of these solutions was performed at the same time, and the polymerization of these monomers was carried out for 3.5 hours. After the completion of polymerization, 75 g of 50% aqueous solution of sodium hydroxide was added for neutralization to obtain water-soluble polymer (1). The results of evaluation of the water-soluble polymer (1) are shown in TABLE 1. The water-soluble polymer (1) was precipitated with methanol, purified, dried, and dissolved in heavy water (D$_2$O) for NMR-analysis. As a result of analysis, the peak of polymerizable double bond disappeared, and it was verified that the absorption of —CH—CH and —CH$_2$— appeared. NMR spectrum of water-soluble polymer obtained in EXAMPLE 1 is shown in FIGS. 1 and 2. FIG. 2 is a graph enlargedly showing NMR spectrum corresponding to 7 to 8 ppm of water-soluble polymer obtained in EXAMPLE 1.

TABLE 1

|  | EXAMPLE 1 | EXAMPLE 2 |
|---|---|---|
| water-soluble monomer (I) 15% aqueous solution of PEG-naphthyletheracrylate (EO: 20 mol) | 115 g | — |
| 20.5% aqueous solution of PEG-allylether naphthylether (EO: 25 mol) | — | 100 g |
| 40% aqueous solution of acrylic acid | 270 g | — |
| 40% aqueous solution of sodium acrylate | — | — |
| 50% aqueous solution of sodium methacrylate | — | 333 g |
| deionized water | 145 g | 207 g |
| 3% aqueous solution of (NH$_4$)$_2$S$_2$O$_8$ | 100 g | — |
| 3% aqueous solution of (NH$_4$)$_2$S$_2$O$_8$ | — | 60 g |
| 50% aqueous solution of NaOH | 75 g | — |
| weight-average molecular weight | 20,000 | 15,000 |
| polymerization rate (weight %) | 98 | 97 |
| ratio of fluorescence intensity (FL$_1$/FL$_2$) | 25 | 18 |
| degree of gelation | 0.06 | 0.08 |
| corrosion rate, mdd (mg/dm$^2$/day) | 28 | 39 |
| scale inhibiting rate (%) | 95 | 98 |

N.B. PEG is the abbreviation of polyethyleneglycol, and EO is the abbreviation of ethyleneoxide.

Example 2

207 g of deionized water was put in a four-necked flask for polymerization similar to that used in EXAMPLE 1. 25 mol of ethyleneoxide was additionally reacted to naphthol with sodium hydroxide as a catalyst, and then reacted with the same equivalent of allylalcohol to obtain polyethyleneglycol allylethernaphthylether. Then, titration was carried out for 100 g of 20.5% aqueous solution of polyethyleneglycol allylethernaphthylether, 333 g of 50% aqueous solution of sodium methacrylate, and 60 g of 5% aqueous solution of ammonium persulfate. Titration of these solutions was performed at the same time for 3.5 hours for polymerization to obtain water-soluble polymer (2). The results of evaluation of the water-soluble polymer (2) are shown in TABLE 1.

Example 3

135 g of deionized water was put in a 1-liter four-necked flask provided with a thermometer, a stirrer and a reflux condenser, and stirring was continued at a temperature of 100° C. Titration was carried out for 350 g of 40% aqueous solution of acrylic acid, 70 g of 40% aqueous solution of allyloxy-2-hydroxy propane sodium sulfonate, 100 g of 7% aqueous solution of ammonium persulfate, and 150 g of 18.5% aqueous solution of polyethyleneglycol naphthyletheracrylate (addition product of ethyleneglycol of 30 mol). Titration of these solutions was performed at the same time for 3.5 hours for polymerization. After the completion of polymerization, 140 g of 48% aqueous solution of sodium hydroxide was added for neutralization to obtain water-soluble polymer (3). The results of evaluation of the water-soluble polymer (3) are shown in TABLE 2.

Examples 4 to 12

In a manner similar to EXAMPLE 3, water-soluble polymers (4) to (12) shown in TABLEs 2 and 3 were obtained according to EXAMPLEs 4 to 12, and the property of these polymers (4) to (12) was evaluated. The results of evaluation are shown in TABLEs 2 and 3.

TABLE 2

|  | Ex. 3 | Ex. 4 | Ex. 5 | Ex. 6 | Ex. 7 | Ex. 8 |
|---|---|---|---|---|---|---|
| water-soluble monomer (I) 18.5% aqueous solution of PEG-naphthyletheracrylate (EO: 30 mol) | 150 g (0.9) | 150 g (1.0) | 150 g (1.2) | 300 g (2.8) | — | — |
| 35% aqueous solution of PEG-naphthyletheracrylate (EO: 20 mol) | — | — | — | — | 400 g (11.3) | — |
| 25% aqueous solution of N-polyoxyethylene carbazole acrylate (EO: 20 mol) | — | — | — | — | — | 150 g (1.2) |
| 40% aqueous solution of acrylic acid | 350 g (93) | 270 g (84) | 205 g (73.9) | 200 g (87.2) | — | 270 g |
| 80% aqueous solution of acrylic acid | — | — | — | — | 80 g (77.5) | 150 g (91.8) |
| 40% aqueous solution of HAPS | 70 g (6.1) | 145 g (15) | 210 g (24.9) | 70 g (10) | 70 g (11.2) | 70 g (7.0) |
| deionized water | 135 g | 135 g | 135 g | 135 g | 135 g | 300 g |
| 48% aqueous solution of NaOH | 140 g | 105 g | 80 g | 80 g | 65 g | 120 g |
| weight-average molecular weight | 12,000 | 7,000 | 9,000 | 4,000 | 3,000 | 5,000 |
| polymerization rate (weight %) | 99 | 98 | 97 | 96 | 95 | 98 |
| ratio of fluorescence intensity ($FL_1/FL_2$) | 20 | 21 | 21 | 55 | 125 | 13 |
| degree of gelation | 0.006 | 0.001 | 0.001 | 0.017 | 0.003 | 0.008 |
| corrosion rate, mdd (mg/dm²/day) | 19 | 9 | 12 | 14 | 11 | 20 |
| scale inhibiting rate (%) | 95 | 96 | 93 | 95 | 92 | 94 |

N.B. PEG is the abbreviation of polyethyleneglycol, EO is the abbreviation of ethyleneoxide, and HAPS is the abbreviation of 3-allyloxy-2-hydroxy propane sodium sulfonate. In the TABLE, the unit of numerical value for each monomer is mol %.

TABLE 3

|  | Ex. 9 | Ex. 10 | Ex. 11 | Ex. 12 |
|---|---|---|---|---|
| water-soluble monomer (I) 18.5% aqueous solution of PEG-phenyletheracrylate (EO: 7 mol) | 100 g (1.9) | 100 g (2.3) | — | — |
| 18.5% aqueous solution of PEG-naphthylether methacrylate (EO: 30 mol) | — | — | 150 g (0.9) | — |
| 18.5% aqueous solution of PEG-naphthylether acrylate (EO: 30 mol) | — | — | — | 150 g (1.2) |
| 40% aqueous solution of acrylic acid | 350 g (92) | — | 250 g (93) | 170 g (58.8) |
| 40% aqueous solution of methacrylic acid | — | 350 g (90.6) | — | — |
| 40% aqueous solution of HAPS | 70 g (6.1) | 70 g (7.1) | 70 g (6.1) | 350 g (40) |
| deionized water | 180 g | 180 g | 180 g | 50 g |
| 48% aqueous solution of NaOH | 140 g | 120 g | 140 g | 70 g |
| weight-average molecular weight | 8,000 | 6,000 | 5,000 | 11,000 |
| polymerization rate (weight %) | 99 | 98 | 98 | 97 |
| ratio of fluorescence intensity ($FL_1/FL_2$) | 5 | 8 | 18 | 20 |
| degree of gelation | 0.007 | 0.013 | 0.009 | 0.019 |
| corrosion rate, mdd (mg/dm²/day) | 22 | 24 | 21 | 125 |
| scale inhibiting rate (%) | 95 | 90 | 94 | 82 |

N.B. PEG is the abbreviation of polyethyleneglycol, EO is the abbreviation of ethyleneoxide, and HAPS is the abbreviation of 3-allyloxy-2-hydroxy propane sodium sulfonate. In the TABLE, the unit of numerical value for each monomer is mol %.

Comparative Example 1

Into a 500 ml four-necked flask provided with a thermometer, a stirrer and a reflux condenser, 18 g of acrylic acid, 2 g of N-vinylcarbazole, and 80 ml of isopropanol solvent were added. Then, a solution in which 0.25 g of thioglycolic acid-2-ethylhexyl was dissolved in 10 ml of isopropanol and a solution in which 1 g of t-butylperoxypivalate was dissolved in 10 ml of isopropanol were added to perform polymerization in a solution. After the completion of solution polymerization, the isopropanol was removed by distillation, 48% aqueous solution of sodium hydroxide was added for neutralization to obtain water-soluble polymer (13). The results of evaluation of the property of this water-soluble polymer (13) are shown in TABLE 4.

TABLE 4

|  | COMPARATIVE EXAMPLE 1 | COMPARATIVE EXAMPLE 2 |
|---|---|---|
| product obtained by polymerization in solution using acrylic acid and N-vinylcarbazole | 18g of acrylic acid, 2g of N-vinylcarbazole | |
| product obtained by polymer reaction of 6-amino-7-hydroxy-4-methylcoumarin in aqueous solution of polymaleic acid | | 1g of polymaleic acid, 19.1mg of 6-amino-7-hydroxy-4-methylcoumarin |
| weight-average molecular weight | 5,000 | 5,000 |
| polymerization rate (weight %) | 89 | — |
| ratio of fluorescence intensity ($FL_1/FL_2$) | 14 | 2 |
| degree of gelation | 0.20 | 0.55 |
| scale inhibiting rate (%) | 45 | 60 |

Comparative Example 2

1 g for solid concentration of aqueous solution of polymaleic acid having the number-average molecular weight of 5000 was added, and pH was adjusted at 4.7 with the addition of aqueous solution of sodium hydroxide. 19.1 mg of 6-amino-7-hydroxy-4-methylcoumarin was reacted to polymaleic acid with 0.02 g of dehydration to synthesize water-soluble polymer (14) exhibiting fluorescence. The results of evaluation of the property of this polymer (14) are shown in TABLE 4.

As shown in TABLEs 1 to 3, the inventive water-soluble polymer has a large ratio of intensity of fluorescence, and is excellent in gelation resistance, scale inhibiting rate, and in corrosion inhibiting ability. On the contrary, as shown in TABLE 4, COMPARATIVE EXAMPLE 1 in which the water-soluble polymer is synthesized by polymerization in a solution shows poor performance in gelation resistance, scale inhibiting rate, and corrosion inhibiting ability. Also, COMPARATIVE EXAMPLE 2 in which the water-soluble polymer obtained through polymer reaction shows poor performance in gelation resistance and scale inhibiting rate compared to a preferred example according to the present invention.

Effect of the Invention

The inventive agent for water treatment is obtainable by synthesizing water-soluble polymer in an aqueous system with the use of water-soluble monomer exhibiting fluorescence. Accordingly, eliminated is a cumbersome process of removing an organic solvent by distillation when polymerization is performed with an organic solution. In addition, it is also advantageous in the aspect of environment, preventing a fire, cost performance and saving natural resources. Fluorescent substances can be introduced to water-soluble polymer in a specified amount by adopting the aqueous system polymerization. This is advantageous in measuring the concentration of water-soluble polymer easily, speedy and accurately and in remarkably improving the accuracy of measuring the concentration of polymer in water.

It should be appreciated that the use of fluorescent water-soluble monomer having a nonionic oxyalkylene chain is effective in suppressing the degree of gelation and in greatly enhancing the ability of inhibiting scale formation and corrosion. In particular, the use of HAPS and monomer having carboxyl group together with water-soluble monomer exhibiting fluorescence as a monomer component for water-soluble polymer is more effective in lowering the degree of gelation and in obtaining an agent for water treatment excellent in inhibiting scale formation and corrosion. Accordingly, the inventive agent for water treatment is advantageously usable as an agent for inhibiting scale formation and corrosion, and an agent for dispersing sludge, flocculant, and the like.

What is claimed is:

1. A method for preventing scale formation and corrosion in circulating water in an aqueous system, comprising the step of adding to the circulating water a water-soluble polymer at a concentration of 1 to 50 ppm, wherein the polymer is obtained by polymerizing a monomer composition comprising:

0.1 to 15 mol %, based on the total monomer content of the monomer composition, of at least one ethylenically unsaturated monomer containing a fluorescent group represented by formula I:

wherein
$A^1$ and $A^2$ are each, independently, a hydrogen, a methyl group or —COOOX, respectively; $A^3$ is a hydrogen, a methyl group, —COOX or —CH$_2$COOX; and $A^1$ and $A^2$ are not —COOX at the same time; $A^1$ and $A^2$ are independently a hydrogen or a methyl group respectively when $A^3$ is —COOX or —CH$_2$COOX; X is a hydrogen, an alkaline metal, an alkaline earth metal, an ammonium group or an organic amine group; $R^2$ is one of —COO—, —CH$_2$COO—, —CONH—, —CH$_2$CONH—, —NH—, —(CH$_2$)$_k$NH—, wherein k is an integer from 1 to 4, and —(CH$_2$)$_l$O—, wherein l is an integer from 1 to 4; $R^1$ is a hydrogen or a methyl group, m is an integer from 1 to 3, n is an integer from 1 to 100; and $R^3$ is an organic group derived from a cyclic aryl or a heterocyclic compound having a conjugated double bond, and 70 to 99.9 mol %, based on the total monomer content of the monomer composition, of at least one ethylenically unsaturated monomer containing at least one carboxyl group, or a salt thereof, wherein the water-soluble polymer has a fluorescence intensity ratio $FL_1/FL_2$ greater than 1, wherein $FL_1$ is the fluorescence obtained by dissolving the water-soluble polymer in pure water at a concentration of 10 ppm and $FL_2$ is the fluorescence intensity obtained by dissolving phenol in pure water at a concentration of 0.1 ppm.

2. A method for preventing scale formation and corrosion in circulating water in an aqueous system according to claim 1, wherein a degree of gelation of the water-soluble polymer is not larger than 0.02.

3. The method of claim 1, wherein n is an integer from 5 to 100.

4. The method of claim 1, wherein the monomer represented by formula I is selected from the group consisting of polyethyleneglycol phenylether(meth)acrylate, polyethyleneglycol phenylether(meth)allylether, polypropyleneglycol phenylether(meth)acrylate, polypropyleneglycol phenylether(meth)allylether, polyethyleneglycol phenylthioether(meth)acrylate, polyethyleneglycol phenylthioether(meth)allylether, polypropyleneglycol phenylthioether(meth)acrylate, polypropyleneglycol phenylthioether(meth)allylether, polyethyleneglycol-2-phenylaminoethylether (meth)acrylate, polyethyleneglycol-2-phenylaminoethylether (meth)allylether, polypropyleneglycol-2-phenylaminoethylether(meth) acrylate, polypropyleneglycol-2-phenylaminoethylether (meth)allylether, polyethyleneglycol benzoate(meth) acrylate, polyethyleneglycol benzoate(meth)allylether, polypropyleneglycol benzoate(meth)acrylate, polypropyleneglycol benzoate(meth)allylether, polyethyleneglycol benzylether(meth)acrylate, polyethyleneglycol benzylether (meth)allylether, polypropyleneglycol benzylether(meth) acrylate, polypropyleneglycol benzylether(meth)allylether, polyethyleneglycol naphthylether(meth)acrylate, polyethyleneglycol naphthylether(meth)allylether, polyethyleneglycol naphthylether(meth)acrylate, polyethyleneglycol naphthylether(meth)allylether, polyethyleneglycol-2-naphthylaminoethylether(meth)acrylate, polyethyleneglycol-2-naphthylaminoethylether(meth) allylether, polyethyleneglycol naphthoate(meth)acrylate, polyethyleneglycol naphthoate(meth)allylether, polyethyleneglycol naphthylmethylether(meth)acrylate, polyethyleneglycol naphthylmethylether(meth)allylether, polyethyleneglycol-9-anthrylmethylether(meth)acrylate, polyethyleneglycol-9-anthrylmethylether(meth)allylether, polyethyleneglycol-2-anthrylaminoethylether(meth) acrylate, polyethyleneglycol-2-anthrylaminoethylether (meth)allylether, polyethyleneglycol anthoate(meth) acrylate, polyethyleneglycol anthoate(meth)allylether, polyethyleneglycol fluorenylether(meth)acrylate, polyethyleneglycol fluorenylether(meth)allylether, polyethyleneglycol-2-fluorenylaminoethylether(meth) acrylate, polyethyleneglycol-2-fluorenylaminoethylether (meth)allylether, polyethyleneglycol fluorene-9-carboxylate (meth)acrylate, polyethyleneglycol fluorene-9carboxylate (meth)allylether, polyethyleneglycol naphthoquinonylether (meth)acrylate, polyethyleneglycol naphthoquinonylether (meth)allylether, polyethyleneglycol anthraquinonylether (meth)acrylate, polyethyleneglycol anthraquinonylether (meth)allylether, polyethyleneglycol-2-anthraquinonyl-aminoethylether(meth)acrylate, polyethyleneglycol anthraquinone-2-carboxylate(meth)acrylate, polyethyleneglycol anthraquinone-2-carboxylate(meth)allylether, polyethyleneglycol pyrenylether(meth)acrylate, polyethyleneglycol pyrenylether(meth)allylether, polyethyleneglycol coumarylether(meth)acrylate, polyethyleneglycol coumarylether(meth)allylether, N-polyoxyethylene imidazole(meth)acrylate, N-polyoxyethylene phenylimidazole(meth)acrylate, N-polyoxyethylene-2-phenylbenzoimidazole(meth)acrylate, N-polyoxyethylene carbazole(meth)acrylate, polyethyleneglycol biphenylether (meth)acrylate, polyethyleneglycol biphenylether(meth) allylether, polyethyleneglycol-2-biphenylaminoethylether (meth)acrylate, polyethyleneglycol-2-biphenylamino-ethylether(meth)allylether, polyethyleneglycol phenylbenzoate(meth)acrylate, polyethyleneglycol phenylbenzoate(meth)allylether, polyethyleneglycol phenylether monomaleate, polypropyleneglycol phenylether monomaleate, polyethyleneglycol phenylthioether monomaleate, polypropyleneglycol phenylthioether monomaleate, polyethyleneglycol-2-phenylaminoethylether monomaleate, polypropyleneglycol-2-phenylaminoethyl-ether monomaleate, polyethyleneglycol benzoate monomaleate, polypropyleneglycol benzoate monomaleate, polyethyleneglycol benzylether monomaleate, polypropyleneglycol benzylether monomaleate, polyethyleneglycol naphthylether monomaleate, polyethyleneglycol-2-naphthylaminoethylether monomaleate, polyethyleneglycol naphthoate monomaleate, polyethyleneglycol naphthylmethylether monomaleate, polyethyleneglycol-9-anthrylmethylether monomaleate, polyethyleneglycol-2-anthrylaminoethylether monomaleate, polyethyleneglycol anthoate monomaleate, polyethyleneglycol fluorenylether monomaleate, polyethyleneglycol-2-fluorenylaminoethyl-ether monomaleate, polyethyleneglycol fluorene-9-carboxylate monomaleate, polyethyleneglycol naphtho-quinonylether monomaleate, polyethyleneglycol anthraquinonylether monomaleate, polyethyleneglycol-2-anthraquinonylaminoethylether monomaleate, polyethyleneglycol anthraquinone-2-carboxylate monomaleate, polyethyleneglycol pyrenylether monomaleate, polyethyleneglycol coumarylether monomaleate, N-polyoxyethylene imidazole monomaleate, N-polyoxyethylene phenylimidazole monomaleate, N-polyoxyethylene-2-phenylbenzoimidazole monomaleate, N-polyoxyethylene carbazole monomaleate, polyethyleneglycol biphenylether monomaleate, polyethyleneglycol-2-biphenylaminoethylether monomaleate, and polyethyleneglycol phenylbenzoate monomaleate.

5. The method of claim 1, wherein the monomer represented by formula I is selected from the group consisting of PEG-naphthylether (meth)acrylate, PEG-allylether naphthylether, N-polyoxyethylene carbazole(meth)acrylate, PEG-phenyletheracrylate.

6. The method of claim 1, wherein the monomer containing at least one carboxyl group or a salt thereof is selected from the group consisting of acrylic acid, methacrylic acid, α-hydroxyacrylic acid, crotonic acid, maleic acid, fumaric acid, itaconic acid, citraconic acid, aconic acid, and salts of said acids.

7. The method of claim 1, wherein the monomer containing at least one carboxyl group or a salt thereof is in the form of a salt.

8. The method of claim 7, wherein the carboxyl group in the monomer containing at least one carboxyl group in the form of a salt forms a salt with a member selected form the group consisting of sodium ion, lithium ion, potassium ion and amines.

9. The method of claim 8, wherein the amines are selected from the group consisting of ammonia, monomethyl amine, diethyl amine, triethyl amine, monoethanolamine, diethanolamine, triethanolamine, isopropanolamine, and sec-butanolamine.

10. The method of claim 5, wherein the monomer containing at least one carboxyl group or a salt thereof is selected from the group consisting of acrylic acid, methacrylic acid, α-hydroxyacrylic acid, crotonic acid, maleic acid, fumaric acid, itaconic acid, citraconic acid, aconic acid, and salts of said acids.

11. The method of claim 10, wherein the monomer containing at least one carboxyl group or a salt thereof is in the form of a salt.

12. The method of claim 11, wherein the carboxyl group in the monomer containing at least one carboxyl group in the form of a salt forms a salt with a member selected form the group consisting of sodium ion, lithium ion, potassium ion, and amines.

13. The method of claim 12, wherein the amines are selected from the group consisting of ammonia, monomethyl amine, diethyl amine, triethyl amine, monoethanolamine, diethanolamine, triethanolamine, isopropanolamine, and sec-butanolamine.

14. The method of claim 1, wherein the monomer composition further comprises at least one additional monomer selected from the group consisting of vinyl sulfonic acid, styrene sulfonic acid, allyl sulfonic acid, sulfoethylmethacrylate, sulfopropylmethacrylate, 2-hydroxyethylmethacrylate, glycerylmonoallylether, acrylamide, methacrylamide, 2-acrylamide-2-methylpropane sulfonic acid, and salts of said acids.

15. The method of claim 14, wherein the monomer composition further comprises 5 to 30% of said at least one additional monomer.

16. The method of claim 1, wherein the monomer composition further comprises 5 to 30% of 3-allyloxy-2-hydroxypropane sulfonic acid or a salt thereof.

17. The method of claim 10, wherein the monomer composition further comprises 5 to 30% of 3-allyloxy-2-hydroxypropane sulfonic acid or a salt thereof.

18. The method of claim 1, wherein the water-soluble polymer has a weight-average molecular weight from 500 to 50,000.

19. The method of claim 10, wherein the water-soluble polymer has a weight-average molecular weight from 500 to 50,000.

20. The method of claim 17, wherein the water-soluble polymer has a weight-average molecular weight from 500 to 50,000.

* * * * *